US 6,687,818 B1

(12) United States Patent
Svenkeson et al.

(10) Patent No.: US 6,687,818 B1
(45) Date of Patent: Feb. 3, 2004

(54) METHOD AND APPARATUS FOR INITIATING EXECUTION OF AN APPLICATION PROCESSOR IN A CLUSTERED MULTIPROCESSOR SYSTEM

(75) Inventors: Penny L. Svenkeson, Forest Lake, MN (US); Philip J. Erickson, Shoreview, MN (US); Peter C. Wilson, Shoreview, MN (US); John A. Miller, Shoreview, MN (US); Doug E. Morrissey, Allentown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/362,388

(22) Filed: Jul. 28, 1999

(51) Int. Cl.[7] .............................................. G06F 15/177
(52) U.S. Cl. ......................................................... 713/2
(58) Field of Search ............................... 713/1, 2, 100

(56) References Cited

U.S. PATENT DOCUMENTS

| 3,641,505 A | 2/1972 | Artz et al. ................ 340/172.5 |
|---|---|---|
| 3,768,074 A | 10/1973 | Sharp et al. .............. 340/172.5 |
| 3,812,469 A | 5/1974 | Hauck et al. ............. 340/172.5 |
| 4,000,485 A | 12/1976 | Barlow et al. ............ 340/172.5 |
| 4,240,143 A | 12/1980 | Besemer et al. ............. 364/200 |
| 4,245,306 A | 1/1981 | Besemer et al. ............. 364/200 |
| 4,253,144 A | 2/1981 | Bellamy et al. ............. 364/200 |
| 4,253,146 A | 2/1981 | Bellamy et al. ............. 364/200 |
| 4,392,196 A | 7/1983 | Glenn et al. ................. 364/200 |
| 4,441,155 A | 4/1984 | Fletcher et al. ............. 364/200 |
| 4,464,717 A | 8/1984 | Keeley et al. ............... 364/200 |
| 4,466,059 A | 8/1984 | Bastian et al. .............. 364/200 |
| 4,488,217 A | 12/1984 | Binder et al. ............... 364/200 |
| 4,562,536 A | 12/1985 | Keeley et al. ............... 364/200 |
| 4,564,903 A | 1/1986 | Guyette et al. ............. 364/300 |
| 4,586,133 A | 4/1986 | Steckler ...................... 364/200 |
| 4,667,288 A | 5/1987 | Keeley et al. ............... 364/200 |
| 4,686,621 A | 8/1987 | Keeley et al. ............... 364/200 |
| 4,843,541 A | 6/1989 | Bean et al. .................. 364/200 |
| 4,875,155 A | 10/1989 | Iskiyan et al. .............. 364/200 |
| 4,967,414 A | 10/1990 | Lusch et al. ............... 371/51.1 |

(List continued on next page.)

FOREIGN PATENT DOCUMENTS

| EP | 0 752 677 A1 | 1/1997 |
|---|---|---|
| WO | WO 95/25306 | 9/1995 |
| WO | WO 96/35172 | 11/1996 |

OTHER PUBLICATIONS

US 5,881,293, 3/1999, Olarig et al. (withdrawn)
Burroughs Corporation, "B68000 Multiprocessor Systems", Aug. 21, 1979, B 6000 Series System Notes, Mark III.1 Release, Sep. 1979, pp. 53–84.

(List continued on next page.)

Primary Examiner—Dennis M. Butler
(74) Attorney, Agent, or Firm—Charles A. Johnson; Mark T. Starr; Crompton, Seager & Tufte, LLC

(57) ABSTRACT

A method and apparatus is disclosed for initiating execution of selected application processors in a clustered multiprocessor system without disrupting the addressing mode of the processors. In one embodiment, this is accomplished by initializing the processors in a conventional way, setting the addressing mode, and then leaving each of the processors in an active mode spinning on a designated Startup Address Location. To start an application processor, the OS simply write a target processor ID and a desired start-up address into the Startup Address Location. The application processor with the matching processor ID reads the Startup Address Location, jumps to the address specified in the Start-Up Address code section, and begins execution at that location. In another embodiment, a processor is provided that does not switch addressing modes when switched from a halt state.

29 Claims, 12 Drawing Sheets

U.S. PATENT DOCUMENTS

| | | | |
|---|---|---|---|
| 5,016,167 A | 5/1991 | Nguyen et al. | 364/200 |
| 5,047,920 A | 9/1991 | Funabashi | 364/200 |
| 5,060,136 A | 10/1991 | Furney et al. | 364/200 |
| 5,067,071 A | 11/1991 | Schanin et al. | 395/275 |
| 5,142,676 A | 8/1992 | Fried et al. | 395/425 |
| 5,237,670 A | 8/1993 | Wakerly | 395/425 |
| 5,251,308 A | 10/1993 | Frank et al. | 395/425 |
| 5,257,361 A | 10/1993 | Doi et al. | 395/425 |
| 5,276,884 A | 1/1994 | Mohan et al. | 395/700 |
| 5,327,538 A | 7/1994 | Hamaguchi et al. | 395/325 |
| 5,392,416 A | 2/1995 | Doi et al. | 395/425 |
| 5,408,629 A | 4/1995 | Tsuchiva et al. | 395/425 |
| 5,465,336 A | 11/1995 | Imai et al. | 395/375 |
| 5,490,280 A | 2/1996 | Gupta et al. | 395/800 |
| 5,497,472 A | 3/1996 | Yamamoto et al. | 395/427 |
| 5,499,354 A | 3/1996 | Aschoff et al. | 395/456 |
| 5,504,874 A | 4/1996 | Galles et al. | 395/472 |
| 5,537,569 A | 7/1996 | Masubuchi | 395/448 |
| 5,555,420 A * | 9/1996 | Sarangdhar et al. | 710/266 |
| 5,568,633 A | 10/1996 | Boudou et al. | 395/468 |
| 5,581,725 A | 12/1996 | Nakayama | 395/449 |
| 5,717,897 A | 2/1998 | McCrory | 395/468 |
| 5,717,942 A | 2/1998 | Haupt et al. | 395/800 |
| 5,724,527 A * | 3/1998 | Karnik et al. | 710/315 |
| 5,860,002 A | 1/1999 | Huang | 395/652 |
| 5,867,658 A | 2/1999 | Lee | 395/200.52 |
| 5,867,702 A | 2/1999 | Lee | 395/651 |
| 6,216,216 B1 * | 4/2001 | Bonola | 712/28 |
| 6,339,808 B1 * | 1/2002 | Hewitt et al. | 710/260 |
| 6,370,606 B1 * | 4/2002 | Bonola | 710/260 |

OTHER PUBLICATIONS

"Exemplar System Architecture", http:/www.hp/com/wsg/products/servers/exemplar/sx–class/exemplar.htm, Downloaded Feb. 12, 1998. (Date of publication unknown).

Stenstrom, et al., "Boosting the Performance of Shared Memory Multiprocessors", Computer, Jul. 1997, pp. 63–70.

M.S. Yousif, et al., "Cache Coherence in Multiprocessors: A Survey", Advances in Computers, vol. 10, 1995, pp. 127–179.

Fred R. Goldstein, "Congestion Control in Frame Relay Networks Using Explicit Binary Feedback", Conference Proceedings, Mar. 27–30, 1991, pp. 563–564.

Intel Corporation, "Intel Architecture Software Developer's Manual", vol. 3, System Programming Guide, Chapters 5 and 7, 1997.

Intel Corporation, "MultiProcessor Specification", version 1.4, May 1997.

PCI Special Interest Group, PCT Local Bus Specification, revision 21, Chapters 1–3 and 6, Jun. 1, 1995.

IBM Technical Disclosure Bulletin, "Compact Global Table for Management of Multiple Caches", vol. 32, No. 7, Dec. 1, 1989, pp. 322–324.

Stenstrom, et al., "Trends in Shared Memory Multiprocessing", Computer, Dec. 1997, pp. 44–50.

* cited by examiner

PRIOR ART

ADDRESS: 0FEE0 0020H
VALUE AFTER RESET: 0000 0000H

ADDRESS: 0FEE0 00D0H
VALUE AFTER RESET: 0000 0000H

ADDRESS: 0FEE0 00E0H
VALUE AFTER RESET: FFFF FFFFH

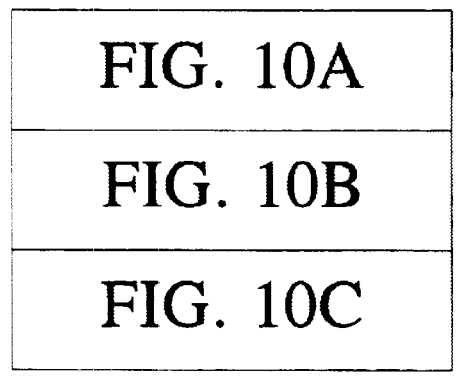
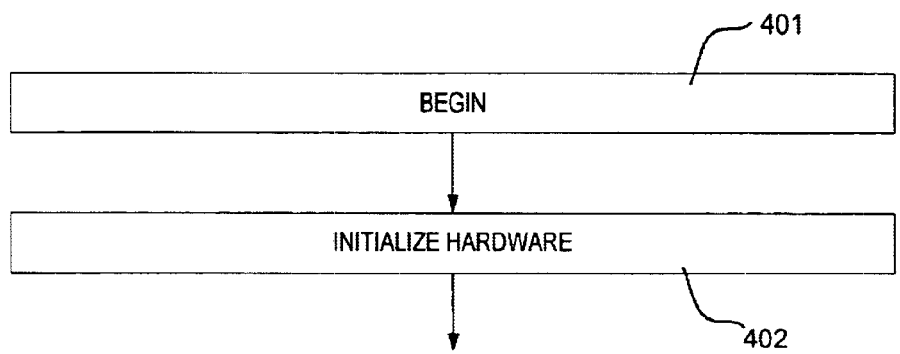
FIG. 10A

STARTUP ADDRESS LOCATIONS

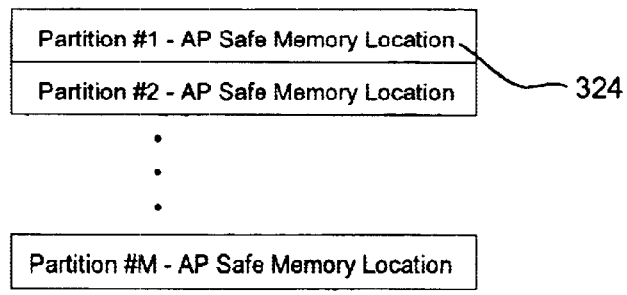

Partition #1 - AP Safe Memory Location
Partition #2 - AP Safe Memory Location
⋮
Partition #M - AP Safe Memory Location

| 3 | 2 | 1 | 0 | RELATIVE BYTE |
|---|---|---|---|---|
| FLAG | START-UP ADDRESS CODE | EXTENDED SAPIC ID | LOGICAL APIC ID | |

LOGICAL APIC ID: LOGICAL APIC ID OF THE SELECTED AP (ALSO CALLED THE DESTINATION ID)
EXTENDED SAPIC ID: EXTENDED SAPIC ID OF THE AP (ALSO CALLED THE EXTENDED DESTINATION ID)
START-UP ADDRESS CODE: STARTING ADDRESS DIVIDED BY 1000H OF THE STARTUP ROUTINE.
  WHEN THE FLAG IS NON-ZERO AND THE LOGICAL APIC ID MATCHES, THE AP JUMPS TO ADDRESS 000XX000H, XX IS THE CODE IN THIS BYTE.
FLAG: WHEN NON-ZERO THE DATA STRUCTURE IS VALID

FIG. 12

METHOD AND APPARATUS FOR INITIATING EXECUTION OF AN APPLICATION PROCESSOR IN A CLUSTERED MULTIPROCESSOR SYSTEM

CROSS REFERENCE TO CO-PENDING APPLICATIONS

The present application is related to U.S. patent application Ser. No. 09/362,389 filed Jul. 28, 1999, entitled "Method And Apparatus For Routing Interrupts In A Clustered Multiprocessor System"; U.S. patent application Ser. No. 09/215,424, filed Dec. 18, 1997, entitled "Computer System and Method for Operating Multiple Operating Systems in Different Partitions of the Computer System and for Allowing the Different Partitions to Communicate with one Another Through Shared Memory", now U.S. Pat. No. 6,314,501; U.S. patent application Ser. No. 09/215,408, filed Dec. 18, 1998, entitled "A Memory Address Translation System and Method for a Memory Having Multiple Storage Units", now abandoned; U.S. patent application Ser. No. 08/965,004, filed Nov. 5, 1997, entitled "A Directory-Based Cache Coherency System", now abandoned; U.S. patent application Ser. No. 08/964,606, filed Nov. 5, 1997, entitled "Message Flow Protocol for Avoiding Deadlocks", now U.S. Pat. No. 6,014,709; U.S. patent application Ser. No. 09/001,588, filed Dec. 31, 1997, entitled "High-Speed Memory Storage Unit for a Multiprocessor System Having Integrated Directory and Data Storage Subsystems", now U.S. Pat. No. 6,415,364, all of which are assigned to the assignee of the present invention and all of which are incorporated herein by reference.

TRADEMARK NOTICES

Unix is a registered trademark of The Open Group. SCO and Unixware are registered trademarks of The Santa Cruz Operation, Inc. Microsoft, Window, Window NT and/or other Microsoft products referenced herein are either trademarks or registered trademarks of Microsoft Corporation. Intel, Pentium, Pentium II Xeon, Pentium III Xeon, Merced and/or other Intel products referenced herein are either trademarks or registered trademarks of Intel Corporation.

TECHNICAL FIELD OF THE INVENTION

This invention relates to multiprocessing data processing systems, and more particularly to symmetrical multiprocessor data processing systems that have a clustered processor architecture. More specifically, the present invention relates to a method and apparatus for booting such clustered multiprocessor systems, and for initiating execution of selected application processors within such systems.

BACKGROUND OF THE INVENTION

Systems having multiple but coordinated processors were first developed and used in the context of mainframe computer systems. More recently, however, interest in multiprocessor systems has increased because of the relatively low cost and high performance of microprocessors, with the objective of replicating mainframe performance through the parallel use of multiple microprocessors.

A variety of architectures have been developed including a symmetrical multiprocessing ("SMP") architecture, which is used in many of today's workstation and server markets. In SMP systems, the processors have symmetrical access to all system resources such as memory, mass storage and I/O.

The operating system typically handles the assignment and coordination of tasks between the processors. Preferably the operating system distributes the workload relatively evenly among all available processors. Accordingly, the performance of many SMP systems may increase, at least theoretically, as more processor units are added. This highly sought-after design goal is called scalability.

One of the most significant design challenges in many multiprocessor systems is the routing and processing of interrupts. An interrupt may generally be described as an event that indicates that a certain condition exists somewhere in the system that requires the attention of at least one processor. The action taken by a processor in response to an interrupt is commonly referred to as the "servicing" or "handling" of the interrupt. Each interrupt typically has an identity that distinguishes it from the others. This identity is often referred to as the "vector" of the interrupt. The vector allows the servicing processor or processors to find the appropriate handler for the interrupt. When a processor accepts an interrupt, it uses the vector to locate the entry point of the handler in a pre-stored interrupt table.

In some multiprocessor systems, a central interrupt controller is provided to help route the interrupts from an interrupt source to an interrupt destination. In other systems, the interrupt control function is distributed throughout the system. In a distributed interrupt control architecture, one or more global interrupt controllers assumes global, or system-level, functions such as, for example, I/O interrupt routing. A number of local interrupt controllers, each of which is associated with a corresponding processing unit, controls local functions such as, for example, inter-processor interrupts. Both classes of interrupt controllers typically communicate over a common interrupt bus, and are collectively responsible for delivering interrupts from an interrupt source to an interrupt destination within the system.

The Intel Corporation published a Multiprocessor (MP) specification (version 1.4) outlining the basic architecture of a standard multiprocessor system that uses Intel brand processors. Complying with the Intel Multiprocessor (MP) specification may be desirable, particularly when Intel brand processors are used. According to the Intel Multiprocessor (MP) Specification (version 1.4), interrupts are routed using one or more Intel Advanced Programmable Interrupt Controllers (APIC). The APICs are configured into a distributed interrupt control architecture, as described above, where the interrupt control function is distributed between a number of local APIC and I/O APIC units. The local and I/O APIC units communicate over a common bus called an Interrupt Controller Communications (ICC) bus. There is one local APIC per processor and, depending on the total number of interrupt lines in an Intel MP compliant system, one or more I/O APICs. The APICs may be discrete components separate from the processors, or integrated with the processors.

The destination of an interrupt can be one, all, or a subset of the processors in the Intel MP compliant system. The sender specifies the destination of an interrupt in one of two destination modes: physical destination mode or logical destination mode. In physical destination mode, the destination processor is identified by a local APIC ID. The local APIC ID is then compared to the local APIC's actual physical ID, which is stored in a local APIC ID register within the local APIC. A bit-wise definition of the local APIC ID register is shown in FIG. 1. The local APIC ID register is loaded at power up by sampling configuration data that is driven onto pins of the processor. For the Intel P6 family processors, pins A11# and A12# and pins BR0# through BR3# are sampled. Up to 15 local APICs can be individually addressed in the physical destination mode.

The logical destination mode can be used to increase the number of APICs, and thus, processors, that can be individually addressed by the system. In the logical destination mode, message destinations are identified using an 8-bit message destination address (MDA). The MDA is compared against the 8-bit logical APIC ID field of the APIC logical destination register (LDR). A bit-wise definition of the logical destination register is shown in FIG. 2.

A Destination Format Register (DFR) is used to define the interpretation of the logical destination information. A bit-wise definition of the destination format register is shown in FIG. 3. The DFR register can be programmed for a flat model or a cluster model interrupt delivery mode. In the flat model delivery mode, bits 28 through 31 of the DFR are programmed to 1111. The MDA is then interpreted as a decoded address. This delivery mode allows the specification of arbitrary groups of local APICs by simply setting each APIC's corresponding bit to 1 in the corresponding LDR. Broadcast to all APICs is achieved by setting all 8 bits of the MDA to one. As can be seen, the flat model only allows up to 8 local APICs to coexist in the system. FIG. 4 is a block diagram of an illustrative multiprocessor system connected in accordance with the flat model delivery mode described in the Intel Multiprocessor (MP) specification (version 1.4).

For the cluster model delivery mode, the DFR bits 28 through 31 are programmed to 0000. In this delivery mode, there are two basic connection approaches: a flat cluster approach and a hierarchical cluster approach. In the flat cluster approach, it is assumed that all clusters are connected to a single APIC bus (e.g., ICC bus). FIG. 5 is a block diagram of an illustrative multiprocessor system connected in accordance with the flat cluster model delivery mode described in the Intel Multiprocessor (NV) specification (version 1.4). In this mode, bits 28 through 31 of the MDA contain the encoded address of the destination cluster. These bits are compared with bits 28 through 31 of the LDR (see FIG. 2) to determine if the local APIC is part of the cluster. Bits 24 through 27 of the MDA are compared with Bits 24 through 27 of the LDR to identify the individual local APIC unit within the selected cluster.

Arbitrary sets of processors within a cluster can be specified by writing the target cluster address in bits 28 through 31 of the MDA and setting selected bits in bits 24 through 27 of the MDA, corresponding to the chosen members of the cluster. In this mode, 15 clusters (with cluster addresses of 0 through 14), each having 4 processors, can be specified in a message. The APIC arbitration ID, however, only supports 15 agents, and hence the total number of processors supported in the flat cluster mode is limited to 15.

The hierarchical cluster approach allows for an arbitrary hierarchical cluster network to be created by connecting different flat clusters via independent APIC buses. FIG. 6 is a block diagram of an illustrative multiprocessor system connected in accordance with the hierarchical cluster model delivery mode described in the Intel Multiprocessor (MP) specification (version 1.4). According to the MP specification, this mode requires a special cluster manager device within each cluster to handle the messages that are passed between clusters. The required special cluster manager devices are not part of the local or I/O APIC units. Instead, they are separately provided. In the hierarchical cluster mode, one cluster may contain up to 4 agents. Thus, when using 15 special cluster managers connected via a single APIC bus (e.g., ICC bus), each having 4 agents, a network of up to 60 APIC agents can be formed.

A problem that may occur when using the hierarchical cluster mode is that the state of the DFR register, shown in FIG. 3, returns to all ones after a power-up reset, or after the execution of an INIT inter-processor interrupt (INIT IPI) instruction. As indicated above, when the DFR register is set to all ones, the logical destination mode register, shown in FIG. 2, is interpreted to be in a flat model delivery mode, which has a maximum configuration of 8 local APICs. This may present a problem when booting the system, and/or when initiating execution of application processors by the operating system from a halted state, as more fully described below.

In an Intel MP compliant system, one of the processors is designated as the bootstrap processor (BSP) at system initialization by the system hardware or by the system hardware in conjunction with the BIOS. The remaining processors are designated as application processors (APs). The BSP is responsible for booting the operating system and initiating execution of the APs.

According to the Intel MP Specification, the APs are in a halted state with interrupts disabled when the first instruction of the operating system is executed by the BSP. Thus, each of the local APICs of the APs are passively monitoring the APIC bus (ICC bus), and react only to the INIT or STARTUP interprocessor interrupt (IPIs) messages.

An INIT IPI is an inter-processor interrupt which causes the local APIC addressed by the INIT IPI message to initialize or reset its corresponding processor. This causes the processor to reset its state and begin executing at a fixed location, which is the reset vector location.

STARTUP IPIs are used with systems based on Intel processors with local APIC versions of 1.x or higher, which can recognize the STARTUP IPI message. The STARTUP IPI message causes the target processor to start executing in Real Mode from address 000VV000h, where VV is an 8-bit vector that is part of the STARTUP IPI message. Startup vectors are limited to a 4-kilobyte page boundary in the first megabyte of the address space. STARTUP IPIs do not cause any change of state in the target processor (except for the change to the instruction pointer), and can be issued only one time after RESET or after an INIT IPI reception or pin assertion.

According to the Intel MP Specification, the operating system typically causes the APs to start executing their initial tasks in the operating system code using the following algorithm.

BSP sends AP an INIT IPI
BSP DELAYs (10 mSec)
If (APIC_VERSION is not an 82489DX)
{
BSP sends AP a STARTUP IPI
BSP DELAYs (200 $\mu$SEC)
BSP sends AP a STARTUP IPI
BSP DELAYs (200 $\mu$SEC)
}
BSP verifies synchronization with executing AP The INIT IPI must be executed before the STARTUP IPI message to get the target AP out of the halt state. This is shown in the pseudo code above. As indicated above, however, the INIT IPI message causes the logical destination register, as shown in FIG. 2, to switch to the flat model delivery mode, which has a maximum configuration of 8 local APICs. For those systems that are constructed in accordance with the cluster model delivery mode, this can disrupt the addressing used to identify the local APICs. A similar problem may occur after power up reset.

What would be desirable, therefore, is a method and apparatus for initiating execution of selected application processors in a clustered multiprocessor system without disrupting the addressing of the local APICs. What would also be desirable is a method and apparatus for booting such clustered multiprocessor systems. Finally, what would be desirable is an application processor that does not switch addressing modes when an INIT IPI or power up reset is executed.

SUMMARY OF THE INVENTION

The present invention overcomes many of the disadvantages of the prior art by providing a method and apparatus for initiating execution of selected application processors in a clustered multiprocessor system without disrupting the addressing mode of the local APICs. In one embodiment, this is accomplished by first initializing the processors, including the AP processors, during a boot routine. This can be done using the INIT IPI message, causing the logical destination registers of the APICs to switch to a flat model. Then, for each cluster, the BSP may broadcast a STARTUP IPI message, which redirects the program flow of each AP to a common initialization procedure. The initialization procedure may assign a specific APIC logical ID to each of the processors, switch the processors from physical addressing mode to logical addressing mode. The initialization procedure may also leave each of the processors of the cluster in an active mode spinning on a predetermined safe memory space (e.g., startup address location). The predetermined safe memory space preferably has a processing module ID section and a startup address code field.

During use, each of the APs compare their own pre-assigned processing module ID with the processing module ID stored in the processing module ID section of the predetermined safe memory location. If their pre-assigned processing module ID matches the processing module ID, the corresponding AP jumps to the startup address specified in the startup address code section of the selected memory location to begin execution. Accordingly, the operating system may initiate execution of any one of the APs at a selected startup address by writing a matching processing module ID into the processing module ID section and a desired startup address of the selected memory location.

It is contemplated that the predetermined safe memory location (e.g., Startup Address Location) may further have a valid flag section. The operating system may write a valid flag (e.g., a one) into the valid flag section when initiating execution of one of the APs. The AP with the matching processing module ID preferably resets the valid flag section after jumping to the desired startup address.

Finally, rather than attempting to avoid disruption of the addressing mode when switching out of a halt state, the present invention also contemplates providing a processor that does not change addressing modes when switched from the halt state. This may eliminate the need for the processor to spin on a predetermined safe memory location, as described above. Accordingly, the overall design and operation of a multiprocessor system may be simplified.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 10A–10C show a flow diagram of an illustrative method for booting and initiating execution of selected application processors (APs) within an Intel MP compliant system;

FIG. 11 is a diagram showing illustrative Startup Address Locations for each of a number of predefined processors;

FIG. 12 is a table showing illustrative fields of one of the Startup Address Locations of FIG. 11.

DETAILED DESCRIPTION OF THE PREFERRED EMBODIMENTS

The present invention provides a method and apparatus for initiating execution of selected application processors in a clustered multiprocessor system without disrupting the addressing mode of the processors, and more specifically, the local interrupt controllers. This can be accomplished by, for example, initiating execution of the application processors (APs) to thereby remove the processors from the halt state, setting the appropriate addressing mode, and leaving the APs spinning on a Startup Address Location. The OS of the partition can then write a target processor ID to the Startup Address Location to initiate execution of a corresponding application processor, without disrupting the addressing mode of the local interrupt controllers. Alternatively, it is contemplated that an application processor may be provided that does not change addressing modes when switched out of a halt state.

Figure 7:
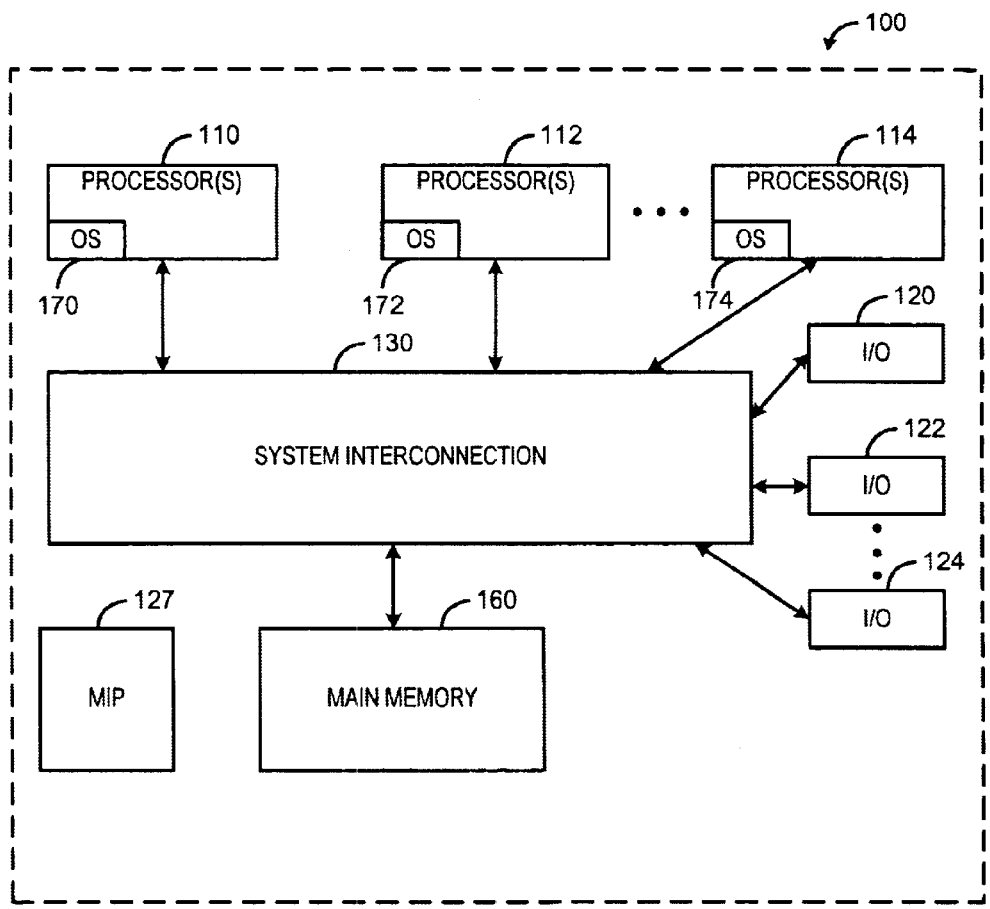
FIG. 7 is a block diagram of a multi-processor system in accordance with the present invention.

FIG. 7 is a block diagram of a multi-processor system in accordance with an illustrative embodiment of the present invention. The multi-processor system includes processor modules 110, 112, and 114. Although processor modules 110, 112 and 114 are preferably of comparable compatibility, it is contemplated that heterogeneous processors and/or operating systems may co-exist.

The processor modules 110, 112 and 114 each preferably include a plurality of processors. Two or more of the processor modules 110, 112 and 114 also share access to main (or global) memory 160 and/or I/O devices 120, 122, and 124, preferably through a system interconnection mechanism, such as system interconnection 130. Processor modules 110, 112, and 114 preferably communicate with each other through main memory 160 (by messages and status information left in common data areas).

One or more processor modules may be configured as a separate partition within the computer system, such that multiple partitions may exist within the multiprocessor computer system. Each partition may operate under the control of a separate operating system. For example, each processor module 110, 112 and 114 of FIG. 7 can be defined as a separate partition, controlled by a separate operating system 170, 172 and 174. Each operating system 170, 172 and 174 preferably views main memory separately as though each is the only entity accessing main memory 160. A maintenance interface processor (MIP) 127 may be provided for providing hardware support and other low level functions to the system.

Figure 8:
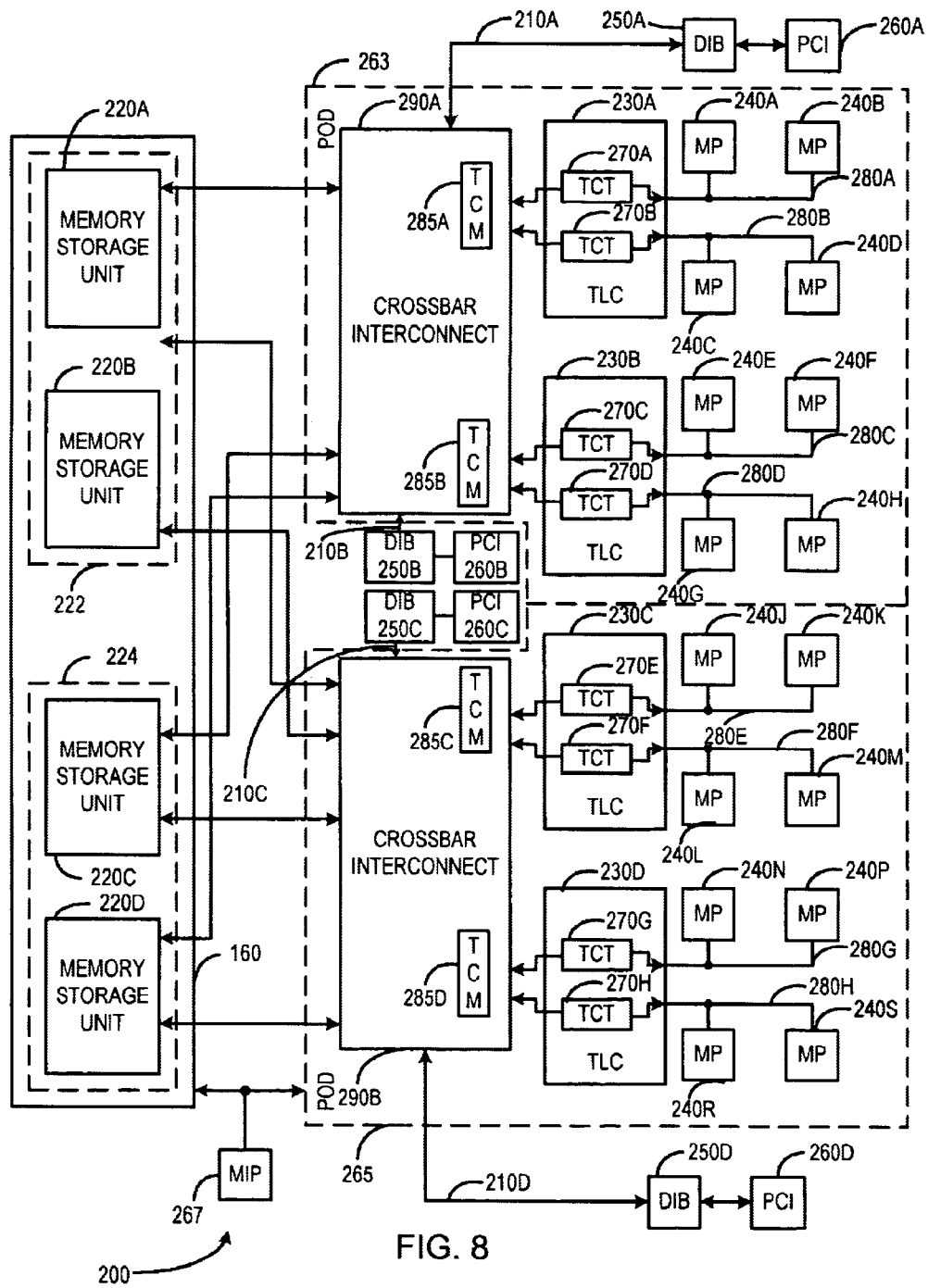
FIG. 8 is a more detailed block diagram of the multi-processor system of FIG. 7.

FIG. 8 is a more detailed block diagram of the multiprocessor system of FIG. 7. The multiprocessor system includes a main memory, illustrated here as main memory 160, and a plurality of processors 240 connected to main memory 160 via respective third level cache modules 230 and crossbar interconnects 290. A first POD 263 includes crossbar interconnect 290A, third level cache modules 230A and 230B, and processors 240A–H. A second POD 265 includes crossbar interconnect 290B, third level cache modules 230C and 230D, and processors 240J–S. In this configuration, the processing modules and the main memory are arranged in a symmetrical multiprocessing architecture, i.e., processor-to-memory latency is the same for each processing module across all of the main memory.

Main memory 160 is preferably a directory-based memory system and is capable of supporting various memory consistency models. Main memory 160 includes a plurality of memory storage units (MSUS) 220, such as memory storage units 220A, 220B, 220C, and 220D. Preferably, each memory storage unit 220A, 220B, 220C, and 220D includes as much as sixteen gigabytes of memory. Also, each memory storage unit 220A, 220B, 220C, and 220D preferably includes sixteen semi-independent banks that share four double-wide data busses and eight unidirectional address busses.

The plurality of third level cache modules 230A through 230D each include two third level cache application specific integrated circuits (e.g., TCT 270A and TCT 270B). Each TCT 270 performs address relocation, reclamation, and translation for memory addresses issued by the processors to which it is connected, as described in co-pending commonly assigned U.S. patent application Ser. No. TN052A, entitled "Computer System and Method for Operating Multiple Operating Systems in Different Partitions of the Computer System and for Allowing the Different Partitions to Communicate with one Another Through Shared Memory", which is incorporated herein by reference.

Each third level cache module 230A through 230D is connected to respective processors (MPs) 240A through 240S, as shown. Specifically, in the illustrative embodiment, each TLC 230 is connected to four processors. Each TLC 230 and its respective four processors define a Sub-Pod. Two Sub-Pods are connected via a crossbar interconnect (e.g., crossbar interconnect 290A or 290B) to form a Pod. Thus, in the embodiment shown, there are four Sub-Pods connected via crossbar interconnects 290A and 290B, respectively, to form two Pods 263 and 265.

Crossbar interconnects 290A and 290B employ a crossbar memory approach, whereby a plurality of cross points are placed at intersections between the processors 240 and memory storage units 220. Within the cross point is a switch that determines the path from a particular processor bus 280 to a particular memory storage unit 220. Each switch point has control logic to set up the transfer path between a processor 240 and main memory 160. The control logic examines the address that is placed on processor bus 280 to determine which memory storage unit 220 is being addressed. The control logic also resolves multiple requests for access to the same memory storage unit 220 on a predetermined priority basis.

Each crossbar interconnect 290 further comprises a pair of third-level-cache memory interface application specific integrated circuits (TCM) 285, which perform address relocation, reclamation, and translation for memory requests from I/O devices, as described in co-pending commonly assigned U.S. patent application Ser. No. TN052A, entitled "Computer System and Method for Operating Multiple Operating Systems in Different Partitions of the Computer System and for Allowing the Different Partitions to Communicate with one Another Through Shared Memory", which is incorporated herein by reference.

Computer system 200 further includes I/O buses 210A through 210D and a plurality of peripheral component interconnects (PCIs), such as PCIs 260A through 260D that are connected via direct IO bridges, such as direct IO bridges (DIB) 250A through 250D. In operation, memory storage units 220 bi-directionally communicate with third level cache modules 230, through crossbar interconnects 290. Crossbar interconnects 290 bi-directionally communicate with direct IO bridges 250 via I/O buses 210, and with processors 240 through TCTs 270. Direct I/O bridges 250 bi-directionally communicate with peripheral component interconnects 260.

The processors (MPs) 240A–240S are preferably Intel brand processors (e.g., Pentium II Xeon, Pentium III Xeon, Merced), Unisys E-mode style processors (used in Unisys A Series and Clearpath HMP NX enterprise servers), or Unisys 2200 style processors (used in Unisys 2200 and Clearpath HMP IX enterprise servers). Preferably, a given Sub-Pod employs four processors of the same type. However, it is contemplated that different Sub-Pods may employ different types of processors. For example, one Sub-Pod may employ four Intel brand processors, while another Sub-Pod may employ four Unisys E-mode style processors.

In such a configuration, the Sub-Pod that has Intel brand processors may be defined as one partition and may run under the control of an Intel-compatible operating system, such as Unix or Windows NT, while the Sub-Pod that employs Unisys E-mode style processors may be defined as another partition and may run under the control of the Unisys MCP operating system. As yet another alternative, the Sub-Pods in two different partitions may both employ Intel processors, but one partition may run under the control of an Intel compatible operating system (e.g., Windows NT), while the other partition may run under the control of the Unisys MCP operating system through emulation of the Unisys A Series computer architecture on the Intel processors in that partition. As indicated in FIG. 7, a maintenance interface processor (MIP) 267 may be provided for providing hardware support and other low level system functions to the system, as more fully described below.

Figure 9:
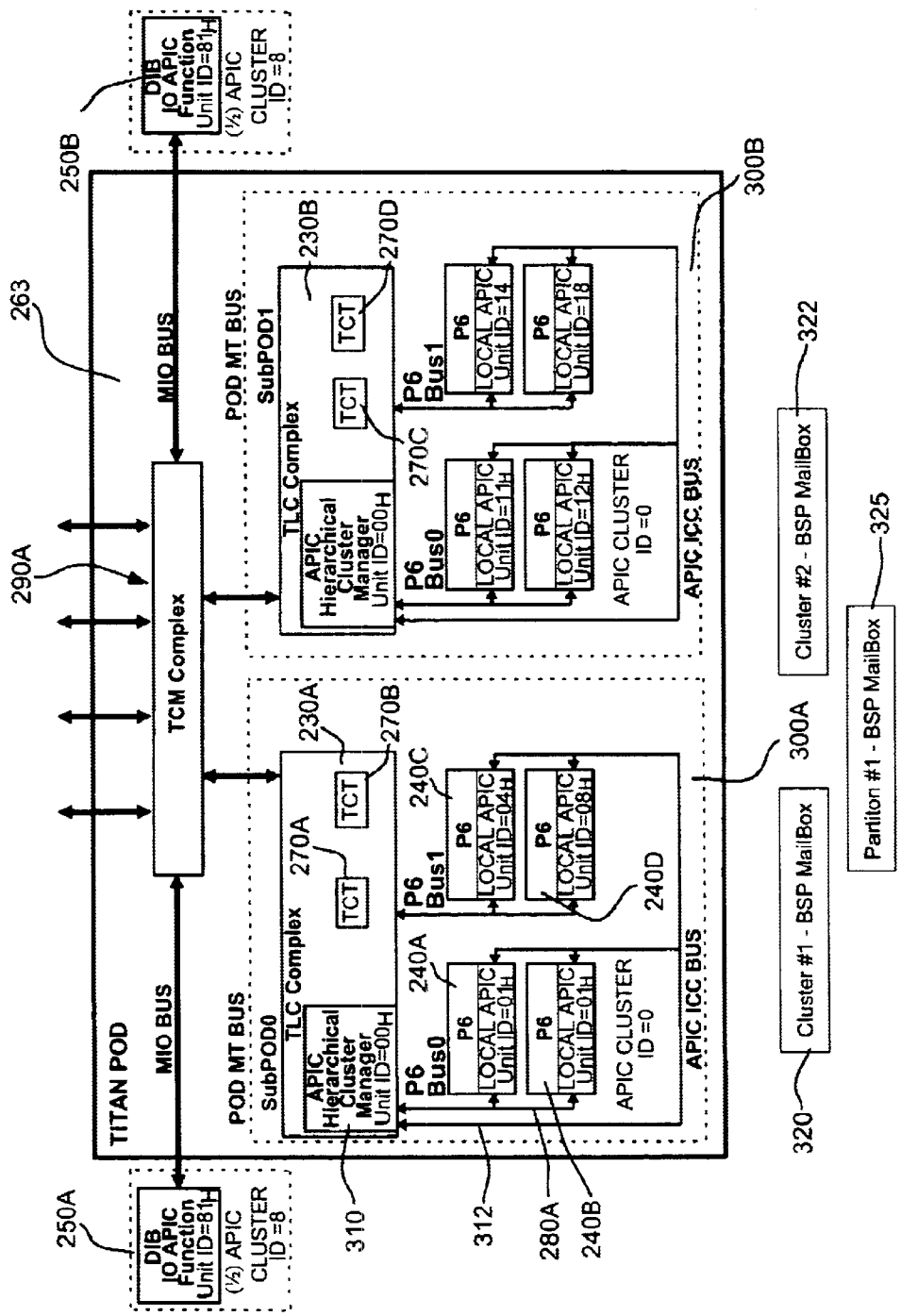
FIG. 9 is a block diagram of one of the PODs of FIG. 8.

FIG. 9 is a more detailed block diagram of Pod 263 of FIG. 8. Pod 263 includes a first Sub-Pod 300A and a second Sub-Pod 300B. Sub-Pod 300A preferably includes four processors 240A–240D. Processors 240A–240B are shown connected to third level cache 230A via a first front side bus 280A. Likewise, processors 240C–240D are shown connected to the third level cache 230A via a second front side bus. Two front side buses 280A and 280B are provided to increase the throughput between the processors 240A–240D and the third level cache module 230A. Sub-Pod 300B is similarly constructed.

Each processor preferably includes a local interrupt controller, as shown. When the processors are Intel brand processors, the local interrupt controller may be an Intel Advanced Programmable Interrupt Controller (APIC). All local APIC Controllers within a Sub-Pod are preferably connected to a hierarchical cluster manager 310 via a single Interrupt Controller Communications (ICC) bus 312. Thus, the multiprocessor system of FIGS. 8–9 preferably is compatible with the hierarchical cluster model delivery mode described in the Intel Multiprocessor (MP) specification (version 1.4), and is not compatible with the flat model delivery mode.

The local APIC Controllers communicate with all other APIC Controllers within the Sub-Pod via the common ICC bus 312. The local APIC Controllers communicate with APIC Controller in other Sub-Pods via the local ICC bus in conjunction with the hierarchical cluster manager 310. Preferably, the hierarchical cluster manager identifies the target Sub-Pod from an address provided in the message, checks to make sure that the message transfer is allowed under the current system configuration, and passes the message to the hierarchical cluster manager of the target Sub-Pod if such a transfer is allowed. A further discussion of communication between APIC Controllers of different Sub-Pods can be found in co-pending U.S. application Ser. No 09/362,389 filed Jul. 28, 1999, entitled "Method And Apparatus For Routing Interrupts In A Clustered Multiprocessor System", which has been incorporated herein by reference.

The multiprocessor system of FIGS. 8–9 preferably has a maximum configuration of four Pods 263, where each Pod has two Sub-Pods 300A and 300B. Therefore, in the maximum configuration, the multi-processor system may include (4 Pods)*(8 processors per Pod)=32 processors. This system can preferably be partitioned on any combination of Pod or Sub-Pod boundaries, and multiple partitions may exist within the system. Each partition may operate under the control of a separate operating system. A further discussion of the multiprocessor system shown and described with reference to FIGS. 8–9 can be found in the above-referenced co-pending patent applications.

Figure 10B:
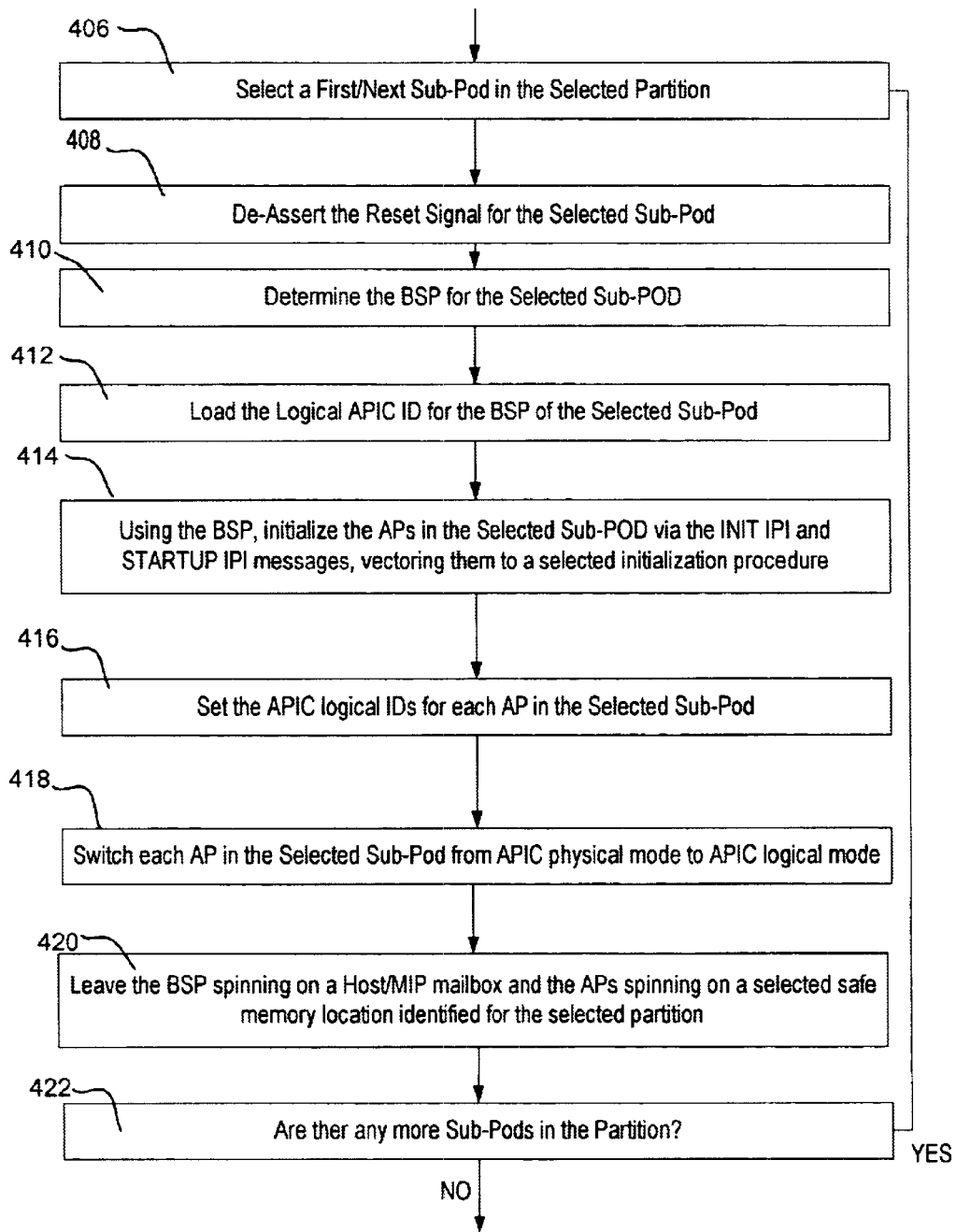
Figure 10C:
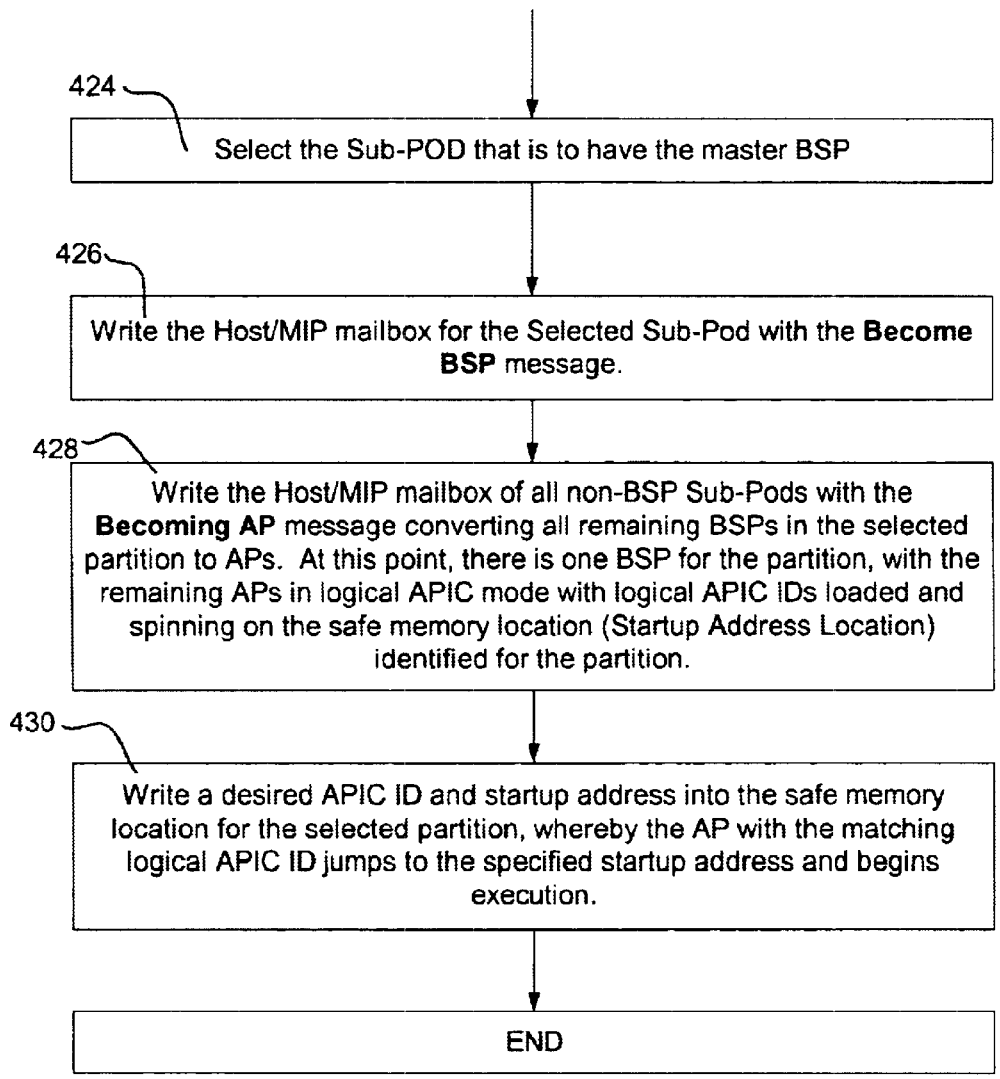

FIGS. 10A–10C show a flow diagram of an illustrative method for booting and multiprocessor system of FIGS. 8–9, and for initiating execution of selected application processors (APs) within the Intel MN Compliant system of FIGS. 8–9. The algorithm is entered at step 401, wherein control is passed to step 402. At step 402, the MIP 267 performs initial low level hardware configuration and initialization. This includes, determining the hardware installed in the system (such as which PODs, Sub-PODs, DIBs, PCI Modules, MSUs, etc., are currently installed), setting all installed hardware to an initial state via scan, and testing main memory and the third level cache modules via Built-in-Self-Test (BIST).

The MIP 267 then loads the BIOS for each partition into main memory. Typically, the BIOS is located in a file on the MIP hard disk. The file contains the BIOS code and information on where to load the BIOS. The MIP loads the BIOS in main memory using the information from the BIOS file. The MIP 267 then loads the BIOS configuration data area, specified in the configuration data area section, into main memory. The configuration data identifies the logical APIC IDs and the local APIC ID for the processors of each Sub-Pod (cluster). The local APIC ID is the powered-on ID of the processors based on the current strapping. The BIOS uses the local APIC ID to assign the appropriate logical APIC ID to each processor.

The MIP 267 then sequentially de-asserts the reset signal to each of the Sub-Pods in the partition, as indicated by the steps 408 and 422. The reset signal causes the processors to perform BIST, and then arbitrate to become the Boot Strap Processor (BSP) for the Sub-Pod, as shown at 410. Preferably, the BSP is determined using a "race for the flag" type of algorithm, where each processor broadcasts it's (modified) APIC ID to all agents within the Sub-Pod, including itself. If a processor receives its own ID back first, it is the BSP. The APIC arbitration ID preferably skews the chance of the "winner" toward the processor with the highest ID. When the BSP is determined, the selected BSP accesses the BIOS code.

The BSP of each Sub-Pod (i.e. cluster) then loads its logical APIC ID, as shown at 412. The BSP also verifies its CPUID against the BIOS configuration data area information, and updates a Cluster Check-In status data structure. The BSP of each Sub-Pod also starts the application processors (APs) residing in it's Sub-Pod that are marked as enabled in the configuration data via the INIT IPI and STARTUP IPI, vectoring them to an initialization procedure as shown at 414.

The initialization procedure initiates a number of actions. First, each AP performs a basic confidence test. Then, each AP sets its APIC logical IDs based on the data provided by the MIP 267, as shown at 416, and then switches from APIC physical mode to logical mode, as shown at 418. Each AP obtains the APIC logical ID from the MIP data structure using an index based on it's bus and processor ID. Each AP then resets a semaphore indicating it completed startup.

Each AP also verifies its CPUID against the BIOS configuration data area information, and updates the Cluster Check-In status data structure. The BSP checks the status of each AP, verifying that all APs have checked in, or waits until a timer has expired. After check-in, each AP is left spinning in a loop waiting for a matching address to be written to a pre-identified Startup Address Location, as more fully described below.

A pair of local mailboxes are provided for each Sub-Pod. These local mailboxes are referred to as Sub-Pod Mailboxes, and are illustrated in FIG. 9. Referring specifically to FIG. 9, Sub-Pod 300A has Sub-Pod Mailbox 320, and Sub-Pod 300B has Sub-Pod Mailbox 322. Sub-Pod Mailboxes 320 and 322 are used to provide communication between the BSPs of each Sub-Pod and the MIP 267.

Once the BSP detects that each AP has updated the Cluster Check-In status data structure, the BSP writes the Sub-Pod Mailbox with a Cluster Check-In message and sets the valid bit. The MIP 267 receives the message, and provides a response to the BIOS. The BSP then polls the appropriate Sub-Pod Mailbox, waiting for a Become BSP or Become AP message from the MIP 267.

The MIP 267 selects the Sub-POD that is to have the master BSP for the partition, as shown at 424. This is preferably the lowest number Sub-POD in which all processors are functional, or if there is only one Sub-POD in the partition, the only Sub-POD minus any failing processors. Once the master BSP is selected, the MIP 267 writes the Sub-Pod Mailbox that corresponds to the Sub-Pod with the master BSP with the Become BSP message, as shown at 426. This releases the master BSP to boot the system. At this point, there is one master BSP for the partition, with the remaining BSPs waiting for the Become AP message from the MIP 267.

Before issuing a Release APs message to the MIP 267, the BIOS initializes selected hardware components and registers including the DIB I/O APIC, PCI card and PCI bus, interrupt vectors, keyboard, video, system memory, etc. Once this is complete, the BIOS issues the Release APs message to the UP 267. This instruction is used by the BIOS to inform the MIP 267 that all BSP processors in the partition that are not the master BSP should be switched to APs. This message is issued after the PCI and DIB I/O APIC configuration so the master BSP can provide the MTRR values based on the map of memory to all of the processors in the partition. All processors running an instance of OS must have the same MTRR value.

In response, the MIP 267 issues a Become AP message to the Sub-Pod Mailboxes for each of the non-master BSP Sub-PODs, as shown at 428. The Become AP message causes the ex-BSPs to generate a response to the MN 267, and enter a loop waiting for a matching address to be written to a corresponding Startup Address Location, such as Startup Address Location 324 of FIG. 11. The Startup Address Location is preferably located in a safe memory location selected by the BIOS, and is preferably in the BIOS memory area. At this point, there is one BSP, with the remaining processors waiting in logical APIC mode for the OS to write a matching address to the Startup Address Location. At this point, the BIOS issues a Switch to Partition message to disable the Sub-Pod Mailboxes and enable the Partition Mailbox 325. Once this is complete, the BIOS issues a BIOS to OS Transition message to the MW 267, and initiates the host OS boot via INT 19.

After the OS has been successfully booted, the OS may activate one of the APs by writing a target APIC ID and startup address to the corresponding Startup Address Location. The AP with the matching APIC ID reads the Startup Address location, jumps to the startup address and begins execution, as shown at 430.

FIG. 11 is a diagram showing a Startup Address Location for each of a number of predefined partitions within a multiprocessor system. As is readily apparent, each partition preferably has a unique Startup Address Location. FIG. 12 shows the format of the Startup Address Location. The Startup Address Location preferably includes a valid flag, a processor startup address code, a logical APIC ID field, and an extended SAPIC ID field.

As indicated above, the BIOS leaves each APs looping on the corresponding Startup Address Location, waiting for the logical APIC ID field in the Startup Address to match their logical APIC ID. To start an AP, therefore, the OS writes a target AP's logical APIC ID, a desired start-up address code, and a valid flag into the Startup Address Location. The AP with the matching logical APIC ID reads the Startup Address Location, jumps to the address specified in the Start-Up Address code section, and begins execution at that location. The AP also may reset the valid flag section after jumping to the desired startup address.

Figure 1:
FIG. 1 is a table showing the fields of the Local APIC ID Register.
Figure 2:
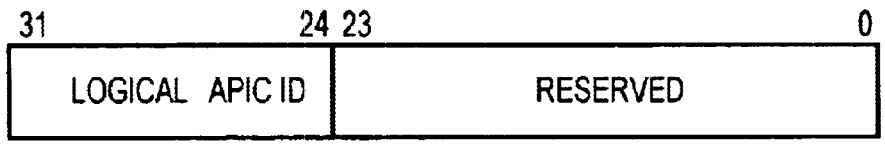
FIG. 2 is a table showing the fields of the Logical Destination Register.
Figure 3:
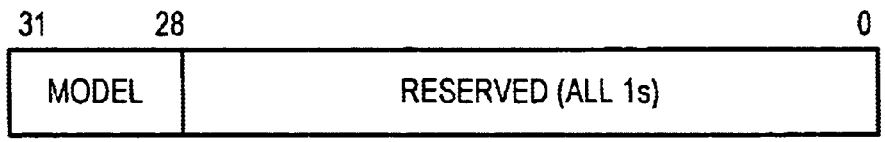
FIG. 3 is a table showing the fields of the Destination Format Register.
Figure 4:
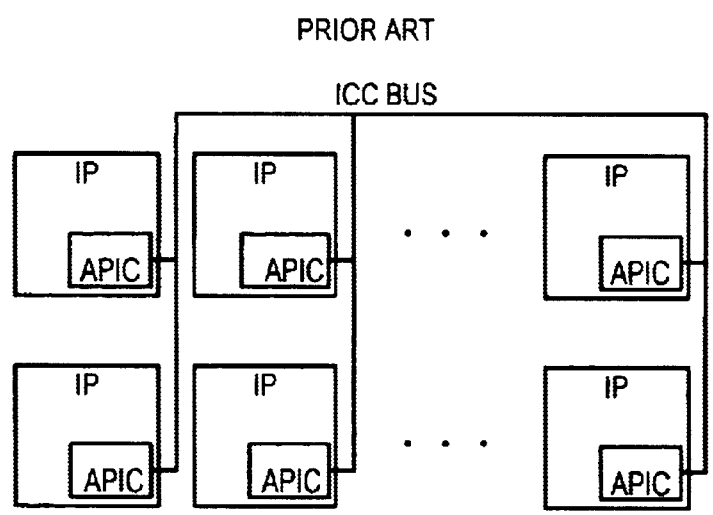
FIG. 4 is a block diagram of an illustrative multiprocessor system connected in accordance with the flat model described in the Intel Multiprocessor (MP) specification (version 1.4)
Figure 5:
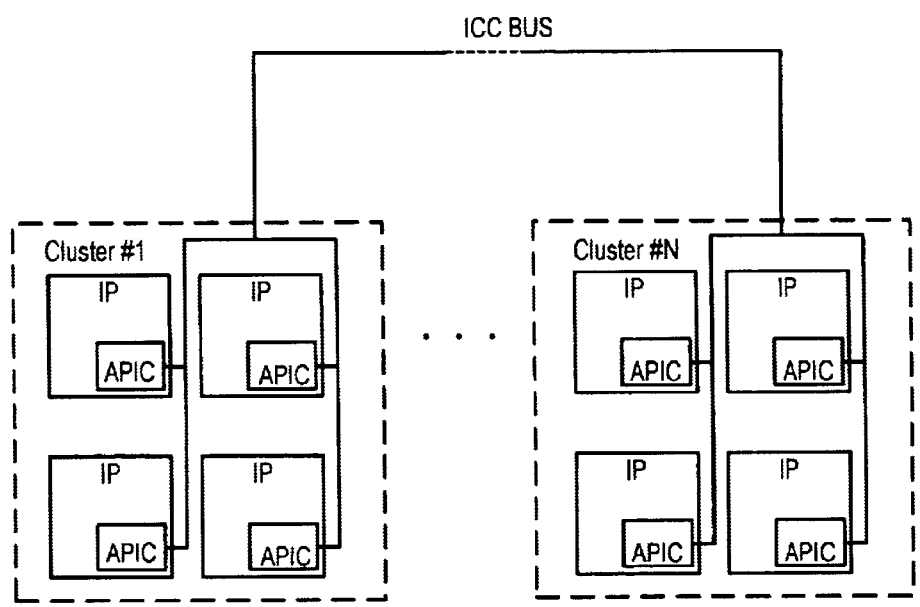
FIG. 5 is a block diagram of an illustrative multiprocessor system connected in accordance with the flat cluster model described in the Intel Multiprocessor (MP) specification (version 1.4)
Figure 6:
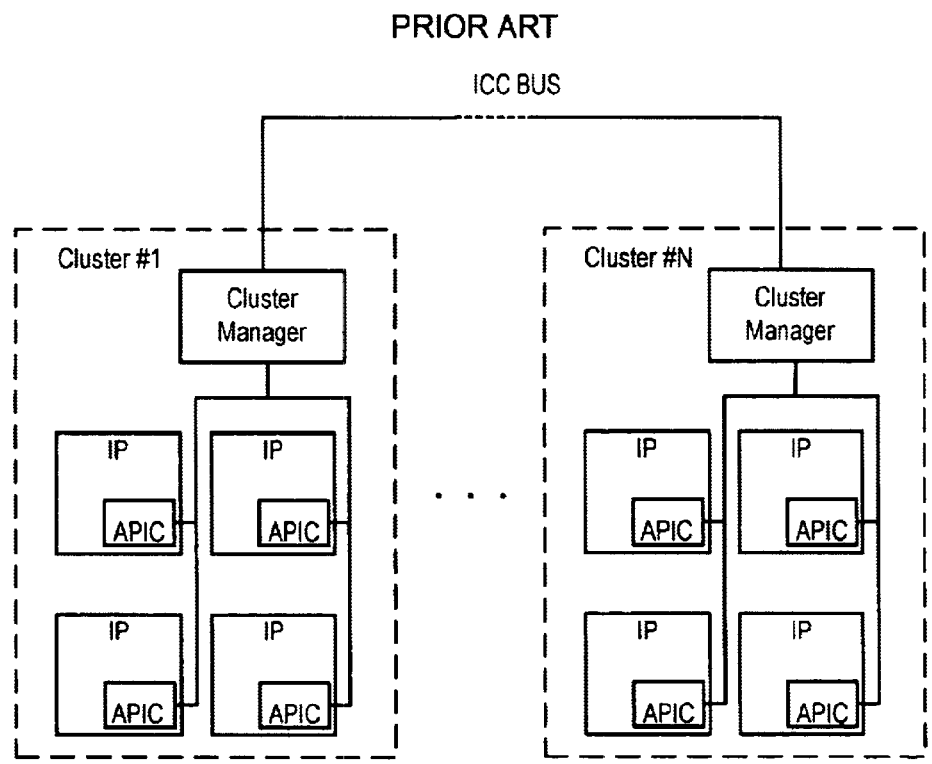
FIG. 6 is a block diagram of an illustrative multiprocessor system connected in accordance with the hierarchical cluster model described in the Intel Multiprocessor (MP) specification (version 1.4)

One reason for leaving the APs spinning on the Startup Address Location is to help avoid the difficulties caused by some Intel brand APIC Controllers, where the APIC Controllers change addressing mode when an INIT IPI message is received. For Intel brand APIC Controllers, the INIT IPI message must be executed before the STARTUP IPI message to get the target AP out of the halt state. However, the INIT IPI message causes the logical destination register, as shown in FIG. 2, to switch to the flat model delivery mode, which has a maximum configuration of 8 local APICs. Thus, for those systems that are constructed in accordance with the cluster model delivery mode, such as the system shown in FIGS. 8–9 above, this can disrupt the addressing mode used to identify the local APICs. A similar problem may occur after a power up reset.

Figure 13:
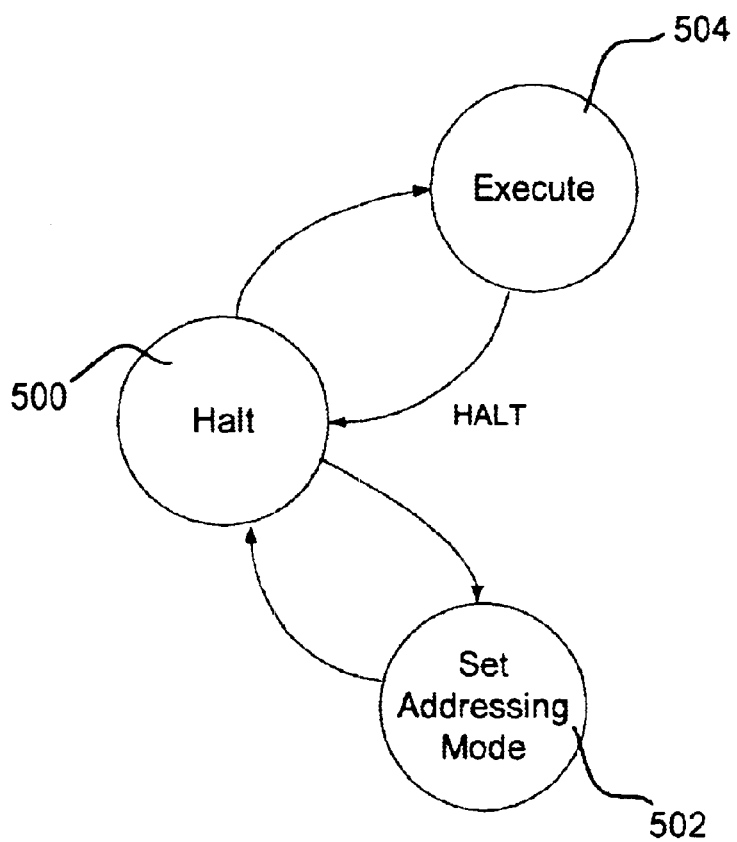
FIG. 13 is a state diagram of a processor that does not change addressing modes when switched from a halt state.

Thus, it is also contemplated that the processors and/or APIC Controllers themselves may be modified so that the addressing mode does not change when switched from a halt state. FIG. 13 is a state diagram of such a processor and/or APIC Controller. The processor preferably has a halt state 500 which is entered after the processor is successfully initialized. Then the addressing mode of the processor may be set in accordance with the current configuration of the multiprocessor system, as shown at 502. After the addressing mode is set, control is preferably returned back to the halt state 500. The operating system may then initiate execution of the processor by providing a startup message having a target processor ID and a desired startup address. The processor ID preferably identifies the target processor and switches the target processor from the halt state 500 to the execute state 504. As can be seen, the addressing mode 502 does not change when switching from the halt state 500 to the execute state 504. This preferably occurs regardless of which addressing mode the processor is currently in.

Having thus described the preferred embodiments of the present invention, those of skill in the art will readily appreciate that the teachings found herein may be applied to yet other embodiments within the scope of the claims hereto attached.

What is claimed is:

1. A multiprocessor data processing system comprising:
   two or more processors;
   one of the processors selected as a bootstrap processor (BSP) for executing an operating system, and selected ones of the remaining processors selected as application processors (AP), each of the application processors having a pre-assigned processing module ID associated therewith;
   storage means including a processing module ID section and a startup address code section, each of the application processors capable of reading the processing module ID and the startup address from said storage means;
   each of the application processors including comparing means for comparing their pre-assigned processing module IDs against the processing module ID section stored in said storage means; and
   the operating system including means for initiating execution of one of the application processing modules at a selected startup address by writing a matching processing module ID into the processing module ID section and a desired startup address into the startup address code section of said storage means, whereby the AP with the matching processing module ID jumps to the startup address.

2. A multiprocessor data processing system according to claim 1, wherein said storage means further includes a valid flag section, wherein the operating system includes means for writing a valid flag into the valid flag section when initiating execution of one of the application processors.

3. A multiprocessor data processing system according to claim 2, wherein the AP with the matching processing module ID includes means for resetting the valid flag section after jumping to the startup address.

4. A multiprocessor data processing system comprising:
   a first cluster including:
      at least one first processing module, wherein each first processing module has a corresponding interrupt controller associated therewith;
      a first hierarchical cluster manager device; and
      a first interrupt controller bus for communicating messages between the interrupt controllers of the at least one first processing modules and the first hierarchical cluster manager device;
   a second cluster including:
      at least one second processing module, wherein each second processing module has a corresponding interrupt controller associated therewith;
      a second hierarchical cluster manager device;
      a second interrupt controller bus for communicating messages between the interrupt controllers of the at least one second processing modules and the second hierarchical cluster manager device;
   means for providing messages between the first hierarchical cluster manager and the second hierarchical cluster manager;
   selected ones of the first and second processing modules are included in a partition;
   each of the selected first and second processing modules of the partition having a pre-assigned processing module IDs associated therewith;
   one of the selected first and second processing modules of the partition being a bootstrap processing (BSP) module for executing an operating system, and the remaining ones of the selected first and second processing modules being application processing (AP) modules;
   storage means for providing a storage space including a processing module ID section, a valid flag section and a startup address code section, each of the application processing modules including comparing means for comparing their pre-assigned processing module IDs against the processing module ID stored in the processing module ID section of said storage space; and
   the BSP module including means for initiating execution of one of the application processing modules in the partition at a selected startup address by writing a matching processing module ID into the processing module ID section, a desired startup address into the startup address code section, and a valid flag into the valid flag section of said storage space, whereby the AP with the matching processing module ID reads the storage space, jumps to the startup address, and resets the valid flag section.

5. A multiprocessor data processing system according to claim 4, wherein the interrupt controller for each of the processing modules is an APIC controller.

6. A multiprocessor data processing system according to claim 5, wherein the first interrupt controller bus is an ICC bus, and the second interrupt controller bus is an ICC bus.

7. A multiprocessor data processing system according to claim 6, wherein each of the APIC controllers communicates using APIC format messages.

8. A multiprocessor data processing system according to claim 7, wherein the first hierarchical cluster manager includes first conversion means for converting APIC format messages into an intermediate format, and second conversion means for converting messages in the intermediate format to APIC format messages.

9. A multiprocessor data processing system according to claim 8, wherein said means for providing messages between the first hierarchical cluster manager and the second hierarchical cluster manager includes a memory.

10. A multiprocessor data processing system according to claim 8, wherein said means for providing messages between the first hierarchical cluster manager and the second hierarchical cluster manager includes a bus.

11. A multiprocessor data processing system according to claim 8, wherein said means for providing messages between the first hierarchical cluster manager and the second hierarchical cluster manager uses the intermediate format.

12. A multiprocessor data processing system according to claim 11, wherein the intermediate format messages require less time to transfer than the corresponding APIC format messages.

13. A multiprocessor data processing system comprising:
   a bootstrap processing module for executing an operating system;
   one or more application processing modules, wherein each of the application processing modules includes an ID register for storing a unique module ID;
   a safe memory area having a processing module ID section and a startup address section, wherein the bootstrap processor includes means for selectively providing a processing module ID and a startup address to the processing module ID section and a startup address section, respectively, of the safe memory area;
   each of the application processing modules having comparing means for comparing the unique module ID stored in the ID register with the processing module ID stored in the processing module ID section of the safe memory area;
   each of the application processing modules further having reading means for reading the startup address from the startup address section of the safe memory area at least when the unique module ID stored in the ID register matches the processing module ID stored in the processing module ID section of the safe memory area; and
   each of the application processing modules having jumping means for initiating processor execution at the startup address read by said reading means.

14. A multiprocessor data processing system according to claim 13, wherein said safe memory area further has a valid flag section, wherein the bootstrap processor includes means for writing a valid flag into the valid flag section when initiating execution of one of the application processing modules.

15. A multiprocessor data processing system according to claim 14, wherein the application processing module with the matching processing module ID includes means for resetting the valid flag section after jumping to the startup address.

16. A method for initiating execution of an application processing module at a desired startup address in a memory of a multi-processor data processing system, wherein the data processing system includes a bootstrap processor for executing an operating system and one or more application processing modules that access the memory, the method comprising the steps of:
   assigning a unique processing module ID to selected ones of the application processing modules;
   providing a desired processing module ID and a startup address to a predetermined storage space in the memory;

having each of the application processing modules access the memory and compare the desired processing module ID with their processing module ID; and having the application processing module with the matching processing module ID read the startup address from the memory and jump to the startup address in the memory.

17. A method according to claim 16, wherein each of the application processing modules compares the desired processing module ID with the processing module ID assigned thereto.

18. A method according to claim 16, wherein the desired processing module ID and a startup address are provided by the bootstrap processor.

19. A method according to claim 16, wherein each of the application processing modules periodically read the predetermined storage space in the memory, and compares the desired processing module ID with the processing module ID assigned thereto.

20. A method according to claim 19, wherein the processing module ID that is assigned to an application processing module is stored in a register within that application processing module.

21. A method according to claim 20, wherein a correspondence between the processing module IDs and the application processing modules is includes in a configuration table.

22. A method according to claim 21, wherein the assigning step accesses the configuration table.

23. A method according to claim 22, wherein a maintenance controller writes the assigned processing module ID into the register of the corresponding application processing module during a boot routine.

24. A method for initiating execution of an application processing module at a desired startup address in a memory in a multi-processor data processing system, wherein the data processing system includes a bootstrap processor for executing an operating system and one or more application processing modules, the method comprising the steps of:

assigning a processing module ID to each of the application processing modules;

providing a storage space having a processing module ID section, a valid flag section and a startup address code section;

writing a desired processing module ID into the processing module ID section, a desired startup address into the startup address code section, and a valid flag into the valid flag section of said storage space;

comparing the processing module ID in the processing module ID section with the processing module IDs assigned to each of the application processing modules; and having the application processing module with the matching processing module ID read the startup address from the startup address code section, jump to the startup address in the memory, and reset the valid flag section.

25. A method according to claim 24, wherein each of the application processing modules compares the processing module ID in the processing module ID section with the processing module ID assigned thereto.

26. A method for booting a data processing system having a number of processing modules, wherein each of the processing module has a corresponding APIC controller that can operate in a physical addressing mode and a logical addressing mode, and wherein the execution of an initialization inter-processor interrupt (init.ipi) causes the corresponding APIC controller to enter the physical addressing mode, the method comprising the steps of:

providing an initialization inter-processor interrupt (init.ipi) to the APIC controller for selected processing modules causing the selected processing modules to enter the physical mode;

providing a startup inter-processor interrupt (startup.ipi) to the APIC controllers for selected processing modules, vectoring them to an initialization procedure;

the initialization procedure assigning an APIC logical ID to each of the selected processing modules, switching the selected processing modules from physical addressing mode to logical addressing mode, and leaving each of the selected processing modules spinning on a selected memory space having a processing module ID section and a startup address code section;

having each of the selected processing modules compare a processing module ID stored in the processing module ID section of the selected memory location with the corresponding assigned processing module ID; and having the processing module with a matching processing module ID jump to the startup address.

27. A processor for use in a multiprocessor system, comprising:

a processing module having a halt state; and an interrupt controller coupled to said processor module having at least two addressing modes, said interrupt controller remaining in whichever one of the addressing modes is selected when said processing module is switched out of the halt state.

28. A processor according to claim 27, wherein the processing module is switched out of the halt state via an initialization type inter-processor interrupt.

29. A processor according to claim 27, wherein the processing module is switched out of the halt state via a startup type inter-processor interrupt.

* * * * *